(12) United States Patent
Austraat et al.

(10) Patent No.: US 10,231,081 B2
(45) Date of Patent: Mar. 12, 2019

(54) COGNITIVE GEOFENCING

(71) Applicant: INTERNATIONAL BUSINESS MACHINES CORPORATION, Armonk, NY (US)

(72) Inventors: Bjorn Austraat, New York, NY (US); Swaminathan Chandrasekaran, Coppell, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/885,542

(22) Filed: Jan. 31, 2018

(65) Prior Publication Data

US 2018/0160262 A1 Jun. 7, 2018

Related U.S. Application Data

(62) Division of application No. 15/219,163, filed on Jul. 25, 2016, now Pat. No. 9,942,707.

(51) Int. Cl.

| | |
|---|---|
| *H04W 24/00* | (2009.01) |
| *H04W 4/021* | (2018.01) |
| *H04L 29/08* | (2006.01) |
| *G06K 9/46* | (2006.01) |
| *G06F 17/30* | (2006.01) |
| *G06K 9/00* | (2006.01) |
| *H04W 4/029* | (2018.01) |

(52) U.S. Cl.
CPC ...... *H04W 4/021* (2013.01); *G06F 17/30241* (2013.01); *G06K 9/00744* (2013.01); *G06K 9/4671* (2013.01); *H04L 67/10* (2013.01); *H04W 4/029* (2018.02)

(58) Field of Classification Search
None
See application file for complete search history.

(56) References Cited

U.S. PATENT DOCUMENTS

| | | |
|---|---|---|
| 8,315,389 B2 | 11/2012 | Qiu et al. |
| 8,977,296 B1 | 3/2015 | Briggs et al. |
| 2011/0092156 A1 | 4/2011 | Park et al. |

(Continued)

FOREIGN PATENT DOCUMENTS

| | | |
|---|---|---|
| EP | 2150834 B1 | 11/2015 |
| WO | 201503629 | 3/2015 |

OTHER PUBLICATIONS

Office Action dated May 9, 2017, 6 pages, U.S. Appl. No. 15/219,163, filed Jul. 25, 2016.

(Continued)

*Primary Examiner* — German Viana Di Prisco
(74) *Attorney, Agent, or Firm* — Conley Rose, P.C.

(57) ABSTRACT

A computing device and method is usable to determine a cognitive geofence according to a plurality of data points. The computing device may analyze the plurality of data points to determine a cognitive dimension associated with each of the data points and a location associated with each of the data points. The computing device may determine the cognitive geofence based at least in part on the determined cognitive dimension and the determined location associated with at least some of the plurality of data points. After determining the cognitive geofence, the computing device may transmit the determined cognitive geofence to a terminal device.

20 Claims, 10 Drawing Sheets

(56) References Cited

U.S. PATENT DOCUMENTS

| | | |
|---|---|---|
| 2011/0092159 A1 | 4/2011 | Park et al. |
| 2012/0124122 A1 | 5/2012 | El Kaliouby et al. |
| 2013/0238658 A1* | 9/2013 | Burris .............. G06F 17/30545 707/770 |
| 2014/0045516 A1* | 2/2014 | Turgman ................ H04W 4/02 455/456.1 |
| 2014/0056489 A1* | 2/2014 | Kiyohara .......... G06F 17/30268 382/118 |
| 2014/0101296 A1 | 4/2014 | Li et al. |
| 2014/0130076 A1 | 5/2014 | Moore et al. |
| 2014/0279123 A1 | 9/2014 | Harkey et al. |
| 2015/0148071 A1* | 5/2015 | Elmore ................ H04W 4/023 455/456.2 |
| 2015/0148077 A1 | 5/2015 | Jelle |
| 2015/0182843 A1 | 7/2015 | Esposito et al. |
| 2015/0186497 A1* | 7/2015 | Patton et al. ..... G06F 17/30598 707/740 |
| 2015/0200871 A1 | 7/2015 | Cheung et al. |
| 2015/0278865 A1 | 10/2015 | Jain et al. |
| 2015/0326624 A1 | 11/2015 | Rajendran et al. |
| 2015/0327061 A1 | 11/2015 | Haddad et al. |
| 2016/0057576 A1 | 2/2016 | Kessler et al. |
| 2016/0188602 A1 | 6/2016 | Glover et al. |
| 2018/0069817 A1 | 3/2018 | Constantinides |

OTHER PUBLICATIONS

Office Action dated Jul. 12, 2017, 16 pages, U.S. Appl. No. 15/219,163, filed Jul. 25, 2016.
Notice of Allowance dated Nov. 30, 2017, 7 pages, U.S. Appl. No. 15/219,163, filed Jul. 25, 2016.
Office Action dated May 2, 2017, 6 pages, U.S. Appl. No. 15/219,165, filed Jul. 25, 2016.
Office Action dated Jul. 14, 2017, 16 pages, U.S. Appl. No. 15/219,165, filed Jul. 25, 2016.
Notice of Allowance dated Dec. 8, 2017, 7 pages, U.S. Appl. No. 15/219,165, filed Jul. 25, 2016.
"List of IBM Patents or Applications Treated as Related," Jan. 31, 2018, 2 pages.
Mell, et al., "Computer Security," NIST Special Publication 800-145, The NIST Definition of Cloud Computing, Computer Security Division, Information Technology Laboratory, National Institute of Standards and Technology, Gaithersburg, MD 20899-8930, Sep. 2011, 7 pages.
Office Action dated Jul. 25, 2018, 16 pages, U.S. Appl. No. 15/885,547, filed Jan. 31, 2018.
Office Action dated Jul. 25, 2018, 14 pages, U.S. Appl. No. 15/885,549, filed Jan. 31, 2018.
Office Action dated Jul. 25, 2018, 16 pages, U.S. Appl. No. 15/885,556, filed Jan. 31, 2018.

* cited by examiner

COGNITIVE GEOFENCING

BACKGROUND

The present disclosure relates to the field of geofencing, and more specifically, to establishing a geofence according to cognitive states.

A geofence is a virtual barrier that is created based on a location, for example a location indicated by a global positioning system (GPS) or radio frequency identification (RFID) system. The geofence may be temporarily or permanently erected around a location taking into account a geographical position, velocity, or other geospatial data. The geofence may be used, for example, to notify a user associated with the geofence when the user enters or exits the geofenced area. However, location-based geofences of the prior art may suffer from limited accuracy and utility due to a lack of breadth of information and criteria considered when determining virtual barrier boundaries for the geofenced area. Therefore, a need may exist for geofences that are erected and modified according to conditions proximate or related to the location, but are not merely geospatial in nature, as well as geofences that account for characteristics of a user in relation to geofence areas.

SUMMARY

In one embodiment, a computer program product for determining a cognitive geofence, the computer program product comprising a computer readable storage medium having program instructions embodied therewith, the program instructions executable by a processor. Executing the program instructions causes the processor to aggregate real-time data received via at least one of a plurality of data feeds, the real-time data comprising a plurality of data points. The processor further determines a subject matter shared by a subset of the plurality of data points. The processor further analyzes the subset of the plurality of data points to determine a cognitive dimension associated with each data point of the subset of the plurality of data points. The processor further analyzes the subset of the plurality of data points to determine a location associated with each data point of the subset of the plurality of data points. The processor further correlates the shared subject matter, the cognitive dimension associated with each data point, and the location to determine a cognitive environment existing at the location. The processor further determines a boundary of a cognitive geofence corresponding to the cognitive environment. The processor further transmits data identifying the boundary of the cognitive geofence to a user equipment such that the data enables the user equipment to display a representation of the cognitive geofence. The disclosed embodiment has the advantage of determining a geofence according to a subject matter and location of focus for cognitive data generated by a plurality of persons, as well as cognitive dimensions expressed by the cognitive data, thereby creating a cognitive geofence with a greater degree of accuracy and utility than geofences created according to the current state of the art.

Optionally, in an embodiment, the processor further obtains at least one image corresponding to the location. The processor further analyzes the at least one image to determine a cognitive dimension associated with the at least one image. The processor further correlates the cognitive dimension associated with the at least one image with the shared subject matter, the cognitive dimension associated with each data point, and the location to determine the cognitive environment existing at the location. The disclosed embodiment has the advantage of performing an image analysis to determine cognitive dimensions, thereby creating a cognitive geofence based on a wide variety of potential data inputs.

In another embodiment, a computer-implemented method that includes various embodiments that are executable, for example, by a computing device. The computer-implemented method may include obtaining, by a computer system that is capable of learning, a plurality of temporally recent data points, each data point comprising at least one entity and at least one facet. The computer-implemented method may also include determining, by the computer system, a location associated with the plurality of temporally recent data points. The computer-implemented method may also include determining, by the computer system, an emotion indicated by the facet and shared by a group of the plurality of temporally recent data points. The computer-implemented method may also include determining, by the computer system, a virtual barrier that bounds the location associated with the plurality of temporally recent data points, the at least one entity, and the facet based on the emotion indicated by the facet. The computer-implemented method may also include transmitting, by the computer system, a description of an area bounded by the virtual barrier to a terminal of a subscriber to a cognitive geofencing service such that the terminal can display the virtual barrier as a cognitive geofence. The disclosed embodiment has the advantage of determining a geofence according to an emotion shared by a plurality of persons proximate to a location, thereby creating a geofence with greater accuracy and utility than those created according to the current state of the art.

Optionally, the virtual barrier is further determined at least in part according to parameters received from the subscriber to the cognitive geofencing service. The disclosed embodiment has the advantage of enabling a subscriber to customize cognitive geofences created for the subscriber, thereby preserving resources by only creating cognitive geofences which are desired by a subscriber.

Further optionally, the location associated with the plurality of temporally recent data points is determined according to a visual image originating from the location. The disclosed embodiment has the advantage of enabling the computer-implemented method to infer the location associated with the plurality of temporally recent data points according to image analysis, thereby enabling determination of the location associated with the plurality of temporally recent data points without explicit textual recitation of a location.

In another embodiment, a system capable of learning, the system comprising a processor configured to execute instructions. The processor is configured to determine that a user equipment registered for use in cognitive geofencing has entered a region for which a subscriber has subscribed to receive cognitive geofences. The processor is further configured to receive a plurality of data points from at least one data feed, the data points comprising one or more text-based data points and one or more image-based data points and having a relationship to the region for which the subscriber has subscribed to receive cognitive geofences. The processor is further configured to determine an associated emotion shared among a plurality of the data points for an area of the region for which the subscriber has subscribed to receive cognitive geofences based on the one or more text-based data points and the one or more image-based data points. The processor is further configured to determine a cognitive geofence based on the emotion associated with the area of the region for which the subscriber has subscribed to receive cognitive geofences. The processor is further configured to transmit the cognitive geofence to a terminal device associated with the subscriber to enable the terminal device to display an indication of the cognitive geofence on a display associated with the terminal device. The disclosed embodiment has the advantage of determining a geofence according to an emotion shared by a plurality of persons proximate to a location and based on a position of a user with respect to the location, thereby saving computing resources by creating a geofence when a user is located near an area encompassed by the geofence.

DETAILED DESCRIPTION

Figure 1:
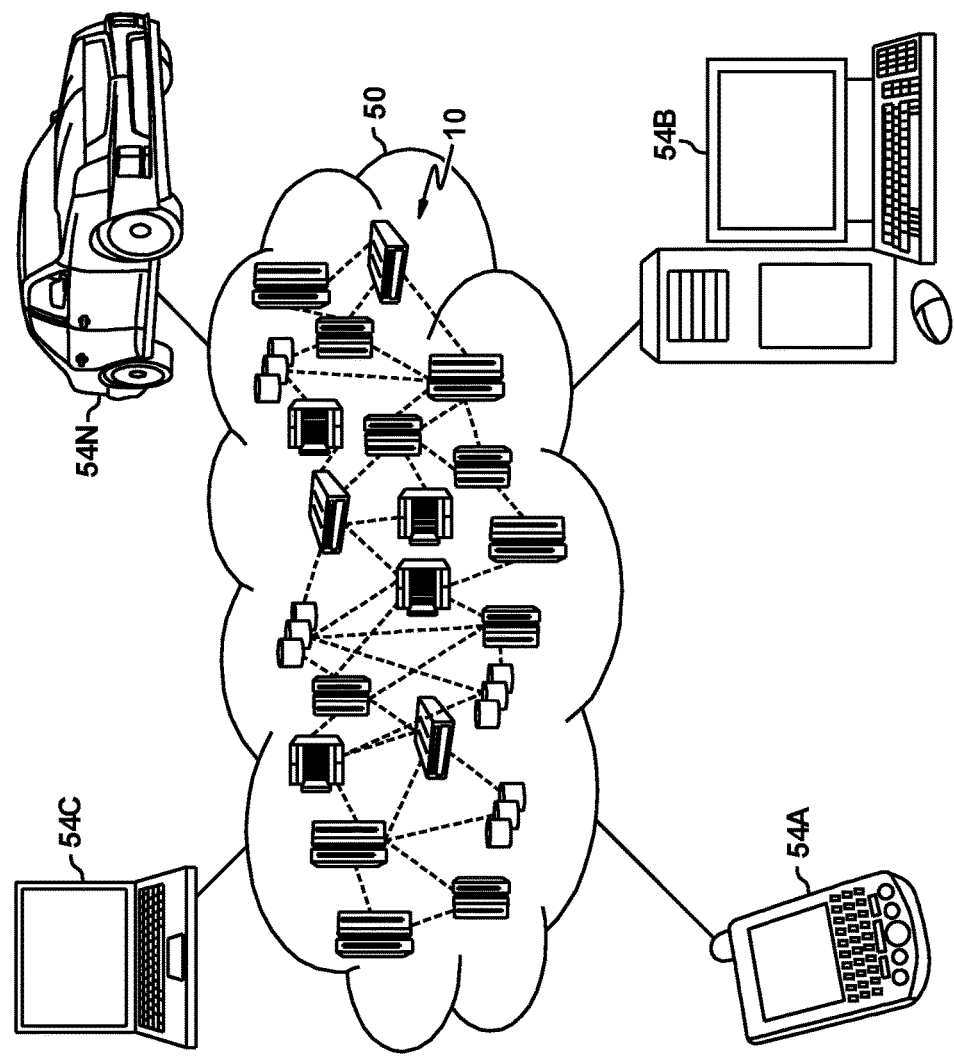
FIG. 1 depicts a cloud computing environment according to an embodiment of the present invention.

With the rapid rise in popularity of social media platforms and the ubiquity of Internet-enabled mobile electronic devices, an amount of Internet-accessible content available from various databases or sources, both public and non-public, has also grown in size. This growth in size has created an ability to leverage these databases for use in various cases such as creating more meaningfully defined geofences using cognitive dimensions to utilize information that was previously inaccessible or impractical to consider. However, content posted to these social media platforms and other online sources may have a less formal structure and have a similar nature to informal commentary or observations. As such, a technical problem of determining a meaning and cognitive dimensions of the content posted to the online sources according to its context, as well as determining a geofence based on those cognitive dimensions in a substantially real-time nature exists. As disclosed herein, the present disclosure addresses these technical problems, for example, through at least the methods 400, 500, 600, 700, 800, and 900.

Disclosed herein are embodiments that provide for cognitive geofencing based on a combination of location-based geofences and location-specific cognitive dimensions related to the location. The cognitive geofences utilize information available from a plurality of publicly available sources such as social media sources, blogs, online news sources, chat and/or bulletin board sources, online communication systems, weather data sources, and/or traffic data sources. The cognitive geofences may further utilize information available from a plurality of non-publicly available sources that elect to share information for creating cognitive geofences and authorize access to non-public data stored within the non-publically available sources. The non-publically available sources may include imaging sources such as dashboard cameras, traffic cameras, weather cameras, and/or automated teller machine (ATM) cameras, as well as other non-public data feeds.

The public and/or non-public data may be real-time data feeds that are accessible via a network such as the Internet and comprise a plurality of data points usable to create the cognitive geofence as a virtual barrier around an area at the location. Each of the data points may be usable in determining a cognitive environment existing at, or proximate to, the location. A new cognitive geofence may then be recommended and/or created, or an existing geofence modified, based on the cognitive environment. In some embodiments, the cognitive geofence may further be based, at least in part, on one or more data points pertaining to a single individual such that some cognitive geofences are erected for a plurality of people, some cognitive geofences are erected for a single person, and some cognitive geofences that are erected do not apply to one or more persons. The cognitive dimensions may be, for example, a sentiment, an emotion, or a mood indicated by the content and associated with an individual who created and or/published the content.

Figure 2:
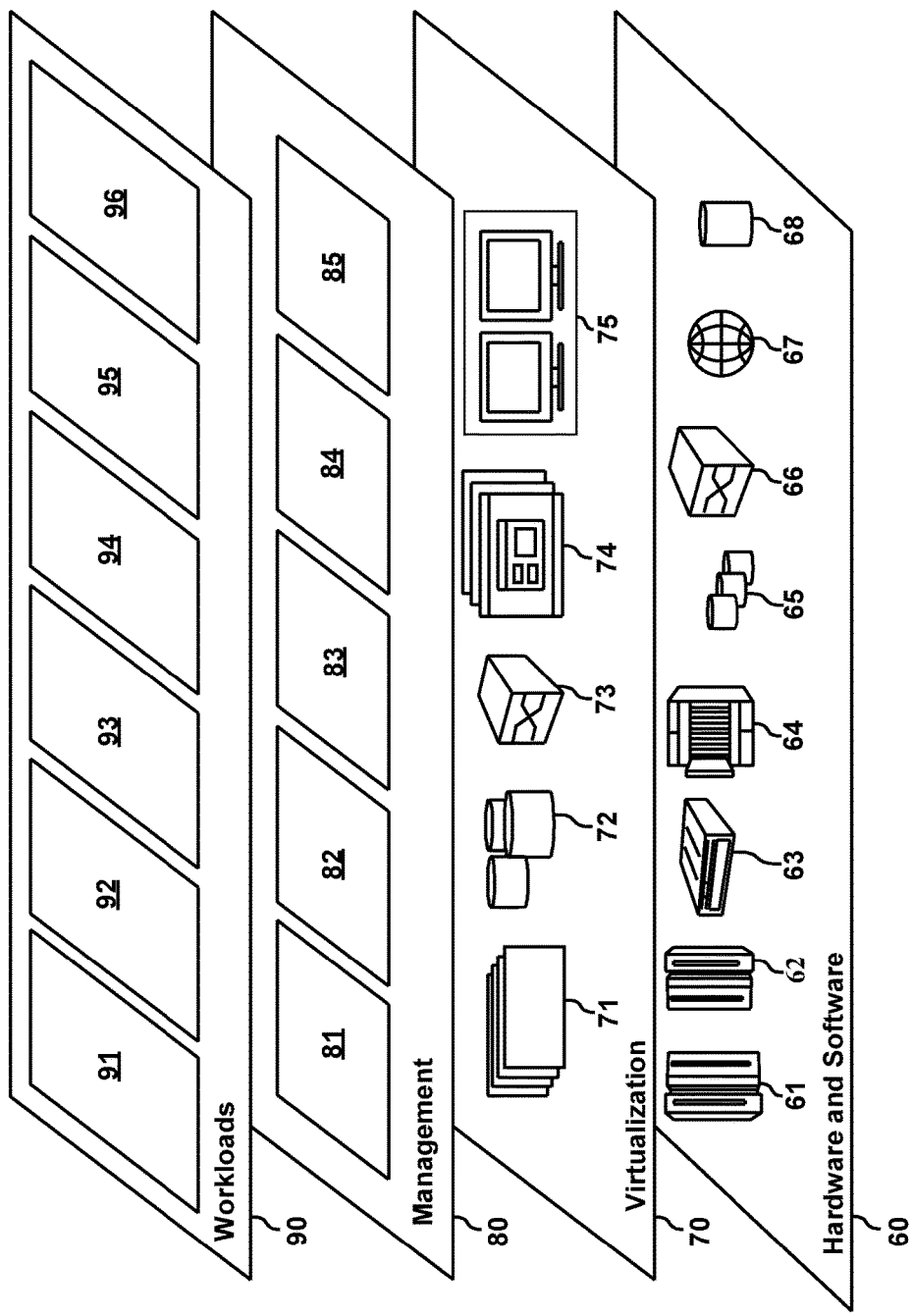
FIG. 2 depicts abstraction model layers according to an embodiment of the present invention.

Turning now to FIGS. 1 and 2, it is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, PDA, or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that cloud computing nodes 10 and cloud computing environment 50 can communicate with any type of computerized device over any type of network and/or network addressable connection (e.g., using a web browser).

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive geofence determination 96.

Figure 3:
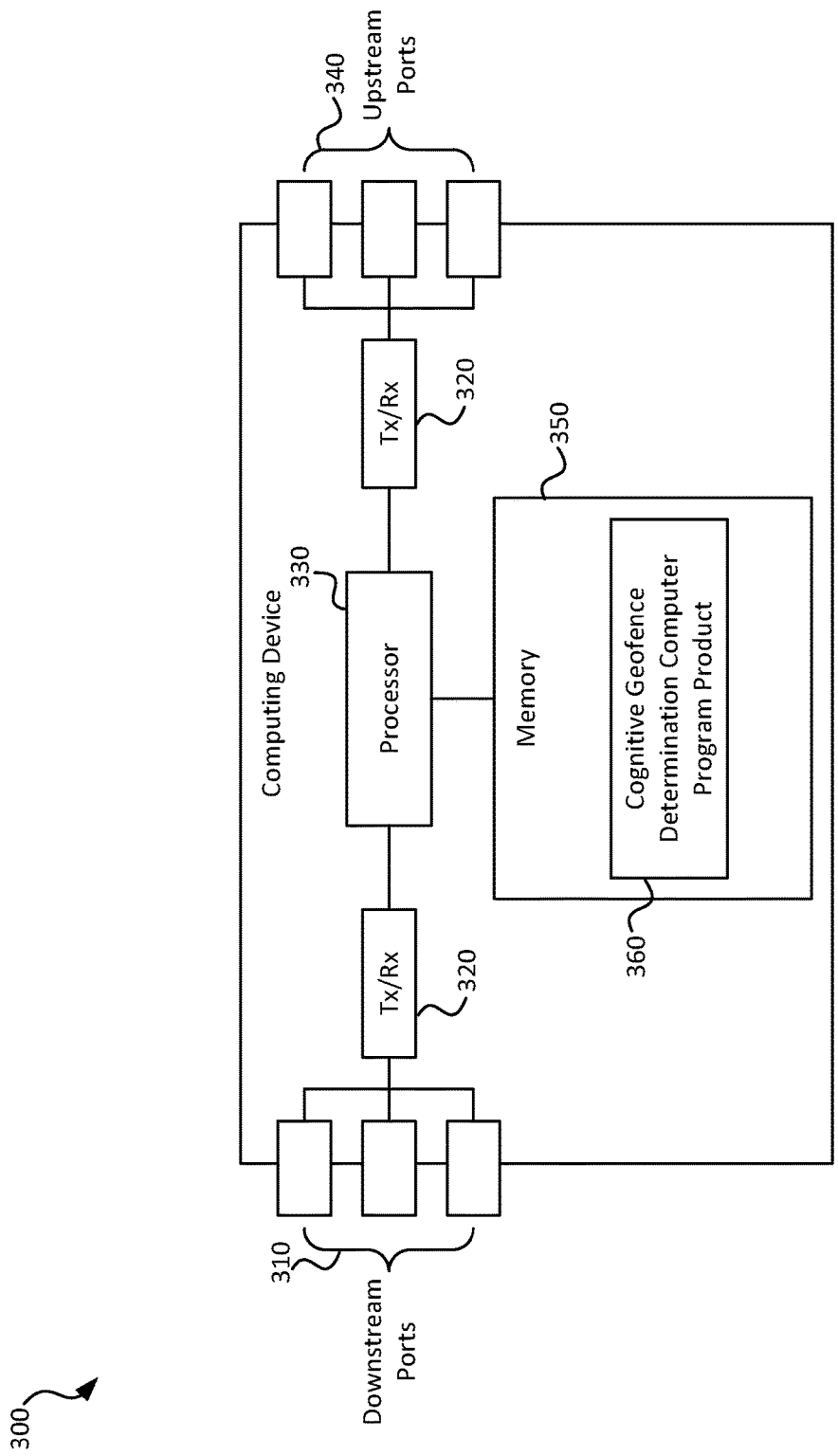
FIG. 3 depicts a computing device according to an embodiment of the present disclosure.

With reference now to FIG. 3, a schematic diagram of a computing device 300 according to an embodiment of the present disclosure is shown. Computing device 300 may be any other suitable processing device capable of performing the functions disclosed herein such as a computer system, a server, a cloud computing node, or may be generally representative of a distributed computing device in which one or more components of computing device 300 are distributed or shared across one or more other devices. Computing device 300 is configured to implement at least some of the features/methods disclosed herein, for example, the cognitive geofencing of methods 400, 500, 600, 700, 800, and 900, discussed below. For instance, the features/methods of this disclosure are implemented using hardware, firmware, and/or software installed to run on hardware. Computing device 300 may be further configured to operate within the cloud computing environment 50, discussed above with respect to FIGS. 2 and 3.

Computing device 300 is a device (e.g., an access point, an access point station, a router, a switch, a gateway, a bridge/router, a server, a client, a user equipment, a mobile communications device, a cloud computing node, a component of a computer system, a component of a distributed computer system, a component of a system capable of learning, etc.) that transports data through a network, system, and/or domain and/or any device that provides services to other devices in a network or performs computational functions. In one embodiment, computing device 300 is an apparatus and/or system configured to implement the cognitive geofencing of methods 400, 500, 600, 700, 800, and 900, for example according to a computer program product.

Computing device 300 comprises one or more downstream ports 310 coupled to a transceiver (Tx/Rx) 320, which are transmitters, receivers, or combinations thereof. The Tx/Rx 320 transmits and/or receives frames from other computing devices via the downstream ports 310. Similarly, computing device 300 comprises another Tx/Rx 320 coupled to a plurality of upstream ports 340, wherein the Tx/Rx 320 transmits and/or receives frames from other nodes via the upstream ports 340. The downstream ports 310 and/or the upstream ports 340 may include electrical and/or optical transmitting and/or receiving components. In another embodiment, computing device 300 comprises one or more antennas coupled to the Tx/Rx 320. The Tx/Rx 320 transmits and/or receives data (e.g., packets) from other computing or storage devices wirelessly via the one or more antennas.

A processor 330 is coupled to the Tx/Rx 320 and is configured to determine a cognitive geofence according to one or more cognitive dimensions. In an embodiment, the processor 330 comprises one or more multi-core processors and/or memory modules 350, which functions as data stores, buffers, etc. The processor 330 is implemented as a general processor or as part of one or more application specific integrated circuits (ASICs), field-programmable gate arrays (FPGAs), and/or digital signal processors (DSPs). Although illustrated as a single processor, the processor 330 is not so limited and alternatively comprises multiple processors. The processor 330 further comprises a cognitive geofencing computer program product 360 that is configured to determine geofences according to cognitive dimensions in received data.

FIG. 3 also illustrates that a memory module 350 is coupled to the processor 330 and is a non-transitory medium configured to store various types of data. Memory module 350 comprises memory devices including secondary storage, read-only memory (ROM), and random-access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage is used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory module 350 may be used to house the instructions for carrying out the various embodiments described herein. For example, alternatively, the memory module 350 may comprise the cognitive geofencing computer program product 360, which is executed according to instructions from processor 330.

It is understood that by programming and/or loading executable instructions onto computing device 300, at least one of the processor 330 and/or the memory module 350 are changed, transforming computing device 300 in part into a particular machine or apparatus, for example, a cognitive geofencing device having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and will be produced in large volume may be preferred to be implemented in hardware (e.g., in an ASIC) because for large production runs the hardware implementation may be less expensive than software implementations. Often a design may be developed and tested in a software form and then later transformed, by design rules well-known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
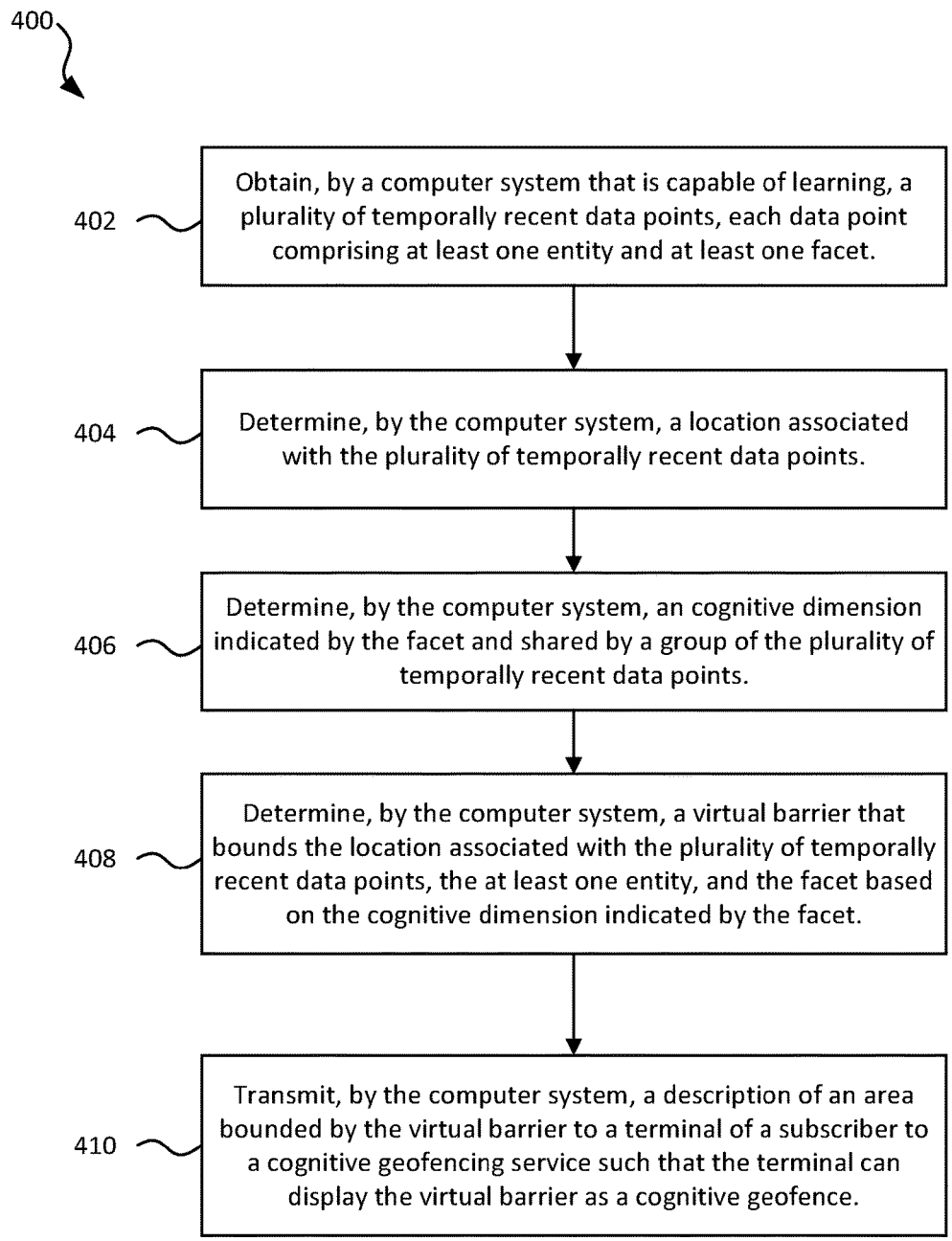
FIG. 4 depicts a flowchart of a method for determining a cognitive geofence according to an embodiment of the present disclosure.

Turning now to FIG. 4, a flowchart of a method 400 for determining a cognitive geofence according to an embodiment of the present disclosure is shown. Method 400 is a computer-implemented method, implemented by a computing device such as computing device 300, to determine a cognitive geofence based, at least in part, on one or more cognitive dimensions having a relationship to a location of the cognitive geofence. The disclosed embodiments of method 400 have the advantage of determining a geofence according to a subject matter and location of focus for cognitive data generated by a plurality of persons, as well as cognitive dimensions expressed by the cognitive data, thereby creating a geofence with greater accuracy and utility than those created according to the current state of the art. It should be understood that the following steps of method 400 may be implemented in any order and are not to be limited based on an order of discussion herein.

At step 402, computing device 300 obtains and/or receives data for use in determining cognitive geofences. Computing device 300 may receive the data as real-time data such as one or more live, or substantially live (e.g., created within a recent time period such as 5 minutes, 10 minutes, 20 minutes, or the like), data feeds, or one or more sources of historical data that is not considered real-time. It should be noted that while the data has been termed as real-time, it is to be understood that existence of an inherent delay between creation and/or publication of the data and receipt of the data by computing device 300 is appreciated by the present disclosure. Use of the phrase real-time data herein may be understood to indicate that computing device 300 receives the data at a time such that the data maintains a temporally recent relationship with an event or occurrence that precipitated creation and/or publication of the data. The data feeds may be obtained, for example, from Internet-accessible sources such as any one or more of social media sources, blogs, news sources, online messaging or comment forums, online bulletin boards, weather sources, traffic sources, and image feeds, and may be in the form of text data, visual/image data, and/or audio data. It should be noted that the above data feeds are merely exemplary in nature and do not limit the scope of data sources contemplated by the present disclosure. Each of the data feeds may be obtained by computing device 300 from one or more Internet-accessible data stores which may each be publicly accessible data stores, or non-publicly accessible data stores to which computing device 300 has received access. Computing device 300 may select one or more data feeds to obtain according to topics that are determined to be temporally recent to a given area, temporally relevant to the given area, or related to a given group of individuals. Additionally, each data feed may include a plurality of discrete data points or elements of data (e.g., posts, comments, photographs, news stories, weather forecasts, traffic alerts, blog posts, etc.). For example, when a received data feed is an online social media data source, each post to the online social media data source that computing device 300 obtains at step 402 may be referred to as a data point. Computing device 300 may obtain any amount of data such that any number of data feeds, each comprising any number of data points, are obtained by computing device 300.

Computing device 300 may determine particular data feeds to obtain for use in determining cognitive geofences according to one or more indicators included within the data feeds and identified by computing device 300. For example, the indicator may be evidence of a preferred and/or distressed event. Computing device 300 may determine the existence of the indicator of the preferred and/or distressed event within the data feeds according to a database of preferred and/or distressed event evidence. Such a database may be stored within computing device 300, or may be stored externally to computing device 300 such that computing device 300 is communicatively coupled with the database (e.g., via a network). The database of preferred and/or distressed event evidence may, in some embodiments, contain a record of events for which computing device 300 may search for related information within the data feeds for use in determining cognitive geofences. Accordingly, computing device 300 may utilize the database of preferred and/or distressed event evidence to identify data feeds that have a probable relationship to a preferred event and/or identify data feeds that have a probable relationship to a distressed event. For example, preferred events may include events such as a free giveaway or promotion at a store or vendor, a public release of a long-awaited and/or desired media element or item, etc. Distressed events may include events such as inclement weather events, occurrences of civil unrest, events anticipated to have a negative effect on traffic conditions, etc. In some embodiments, a single event may be considered both a preferred event and a distressed event (e.g., the public release of the long-awaited and/or desired media element or item may be a preferred event as a result of public excitement and desire, and may be a distressed event as a result of anticipated traffic conditions in one or more areas proximate to the public release).

In some embodiments, each data point comprises an indication of at least one entity and may comprise indications of one or more facets related to the respective entities. Computing device 300 may identify and/or determine entities included within data points, for example, according to named entity recognition. As used herein, an entity may be referred to as a subject or subject matter of a data point, and may generally be defined as something capable of being observed or sensed in the physical world. A facet may be referred to as a meaningful element of the data point that describes or provides context for the entity. For example, an individual at a concert may publish data to an online social media platform that identifies an artist that is currently performing at the concert and descriptive information that accompanies the artist identification. The descriptive information may be, for example, the individual's feeling toward the artist or artist's music, such as "amazing." In one embodiment, the artist may be considered an entity, and the descriptive information (e.g., "amazing") may be considered a facet. It should be noted that a number of facets present in a data point to describe an entity is not limited, and multiple facets, or pairs of facets, may be included in the data point as meaningful elements of the data point that are related to the entity.

At step 404, computing device 300 performs an analysis on the data received at step 402 to determine a location associated with the data points. Computing device 300 may determine the location based on geographic tags or other data that explicitly identifies a location and are appended to the data points, for example as metadata, or other location-determining means such as triangulation of a user equipment from which the data point originated based on a proximity of the user equipment. Alternatively, computing device 300 may infer the location based on a contextual and/or semantic analysis of text content of the data point and/or image content of the data point. For example, for a data point that includes a photograph of an event from a perspective of a spectator's seat, computing device 300 may infer that a location associated with that data point is at an event venue. Computing device 300 may perform further analysis on the photograph to determine other unique and/or identifying characteristics of the photograph to identify the particular event venue depicted in the photograph, and thereby the location associated with the data point. When a caption or other text based content is associated with the photograph by a publisher of the photograph, or alternatively when the text based content is published at a time proximate to a time of publication of the photograph, the caption or text based content may also be used independently, or in conjunction with the photograph, to infer the location associated with the data point. Using the above example of a photograph from an event venue, if an individual who publishes the photograph also publishes a caption or other text based content stating a city for the event, a name of the event venue, a subject of the event, or other like information, computing device 300 may utilize that information to infer the location associated with the data point. For example, returning to the above example of a concert, the individual at the concert may post a photograph with or without a caption, and/or text based content, to an online social media platform. When the post is a photograph, computing device 300 may infer the location associated with the data point according to a content of the photograph such as an artist visible in the photograph or venue surroundings that are present in the photograph such as geographic features, architectural features, or identifying features such as advertising signs visible in the photograph. When the photograph includes a caption, or when text based content is published to the social media platform at a time proximate to a time of publication of the photograph, computing device 300 may infer the location associated with the data point according to a content of the caption or text based content such as a name of an artist, a name of a venue, a name of a city, or a name of an event. In inferring the location associated with the data point, computing device 300 may compare one or more aspects or portions of content from the data point to one or more online data stores. For example, returning to the above example, computing device 300 may compare portions of the text based content published to the social media platform to a concert schedule to infer the location associated with the data point. Embodiments in which the location is inferred from images have the advantage of a greater amount of flexibility in determining a location for creating a geofence based on cognitive data, thereby creating a geofence based on a wider and more varied range of data than those created according to the current state of the art. For embodiments that utilize entities and/or facets, computing device 300 may infer the location associated with the data points from the entities and/or facets.

At step 406, computing device 300 determines a cognitive dimension (e.g., a sentiment or emotion) associated with each data point of the data received at step 402. The cognitive dimension may indicate, for example, a positive emotion associated with the data point, or a negative emotion associated with the data point. The cognitive dimension may be reflective of an emotional state of an individual who creates and/or publishes the data point as existing at the time of creation and/or publication of the data point. Returning to the above example of the individual at a concert publishing data to the online social media platform indicating the individual's belief that the artist or artist's music is "amazing," the individual's post to the online social media platform may be considered to have a positive sentiment. Similarly, other words traditionally give a positive or favorable meaning may also indicate a positive sentiment. Correspondingly, words traditionally given a negative or unfavorable meaning may indicate a negative sentiment. For example, returning to the above example of the individual at a concert, the individual may publish data to the online social media platform indicating the individual's belief that the artist, artist's music, concert, venue, or other element of the concert is "disappointing." In this example, the individual's post to the online social media platform utilizing "disappointing" may be considered to have a negative sentiment As illustrated by the above examples, computing device 300 determines the cognitive dimension associated with each data point according to a semantic analysis and/or context of content of the data point. In this manner, computing device 300 may also determine the cognitive dimensions associated with each data point according to a contextual or semantic analysis of a photograph originating from the location associated with the data point, for example, as determined at step 404.

At step 408, computing device 300 determines a virtual barrier that bounds the location associated with the plurality of temporally recent data points, the at least one entity, and the facet based on the cognitive dimension indicated by the facet. Computing device 300 may group data points having a common or similar cognitive dimension when the data points also share a common associated location. When computing device 300 determines that a number of temporally recent data points exist from a common location and share a common cognitive dimension, computing device 300 may determine that a cognitive geofence associated with that common location may be desirable. Returning to the above example, if computing device 300 determines that a number of individuals at the concert have published posts to online social media platforms sharing the positive sentiment of the first individual, computing device 300 may determine that a cognitive geofence around the concert venue is desirable. For example, computing device 300 may determine that the cognitive geofence around the concert venue is desirable based on a subscription from a wireless communication service provider to a cognitive geofencing service that requests cognitive geofences around areas where a plurality of individuals over a threshold (e.g., a predefined threshold or a threshold set by the subscriber) express a positive sentiment, thereby suggesting that the wireless communication service provider might wish to reallocate resources to provide greater network capacity to communications equipment at, or proximate to, the area encompassed by the cognitive geofence. In another embodiment, computing device 300 may determine that the cognitive geofence around the concert venue is desirable based on a subscription from a municipal or city government to the cognitive geofencing service that requests cognitive geofences around areas where traffic management may be desirable. Computing device 300 may determine that such a condition exists when computing device 300 determines, based on a context and/or cognitive dimensions of the data points, that a large number of individuals having a positive or negative sentiment may be departing from the concert venue.

At step 410, responsive to determining that a cognitive geofence is desirable, computing device 300 transmits a description of an area encompassed by the cognitive geofence to a subscriber to the cognitive geofencing service. For example, computing device 300 may transmit the description of the area encompassed by the cognitive geofence to a terminal of the subscriber to cause the terminal to display the cognitive geofence on a display of the terminal as text, graphical images, or a combination of both.

Figure 5:
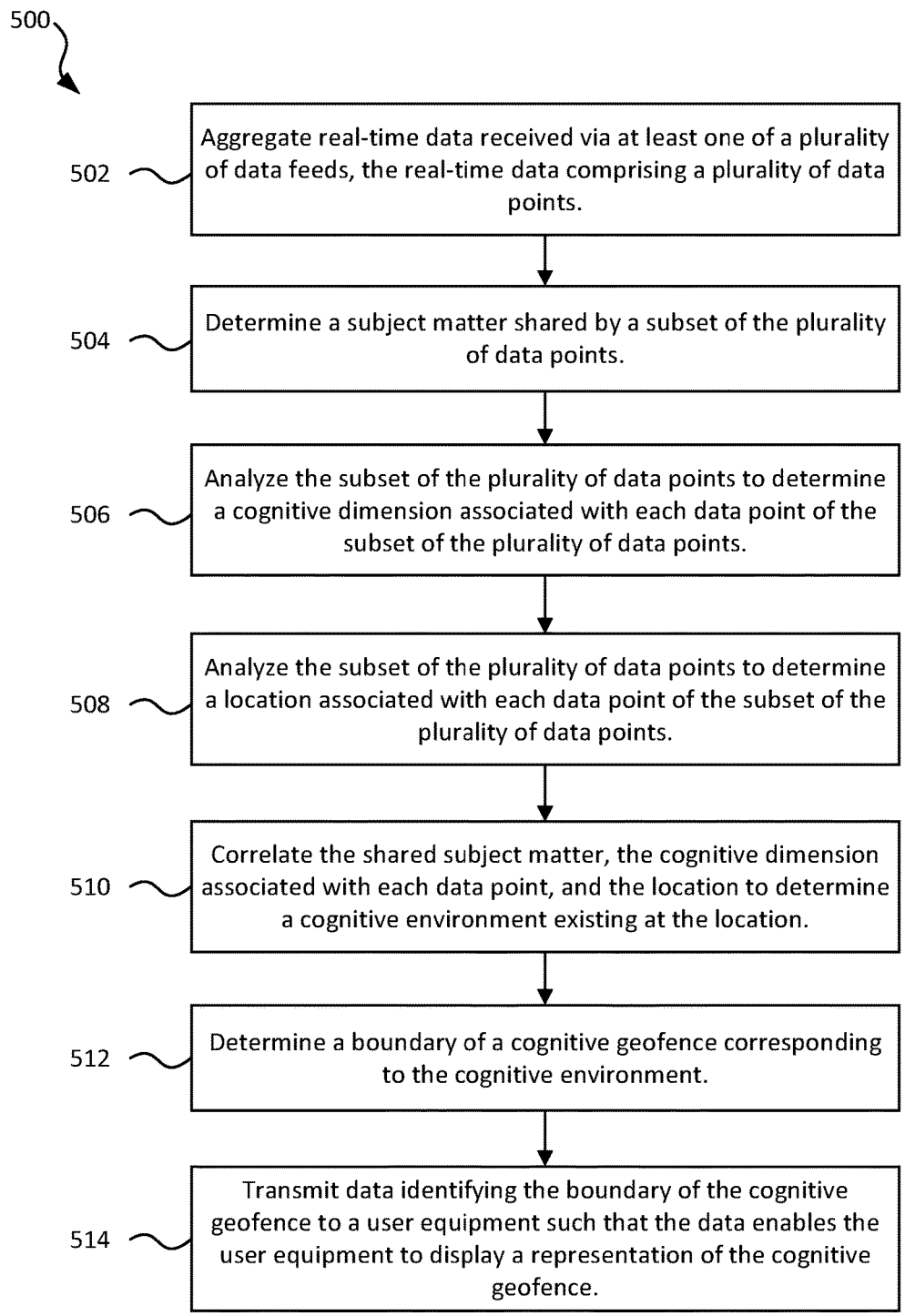
FIG. 5 depicts a flowchart of another method for determining a cognitive geofence according to an embodiment of the present disclosure.

Turning now to FIG. 5, a flowchart of another method 500 for determining a cognitive geofence according to an embodiment of the present disclosure is shown. Method 500 is a computer-implemented method, implemented by a computing device such as computing device 300, to determine a cognitive geofence based, at least in part, on one or more cognitive dimensions having a relationship to a location of the cognitive geofence and a subject matter common to the location. The disclosed embodiments of method 500 have the advantage of determining a geofence according to an emotion shared by a plurality of persons proximate to a location, thereby creating a geofence with greater accuracy and utility than those created according to the current state of the art. It should be understood that the following steps of method 500 may be implemented in any order and are not to be limited based on an order of discussion herein.

At step 502, computing device 300 aggregates real-time data received via at least one of a plurality of data feeds, each of the data feeds comprising a plurality of data points. Computing device 300 may receive the real-time data in a manner substantially similar to that of step 402, as discussed above. For example, the data points may be textual and/or graphical in nature and have a temporal recency. At step 504, computing device 300 determines a subject matter (e.g., an entity) common to, or shared by, a subset of at least some of the plurality of data points of the real-time data received at step 502. For example, computing device 300 may perform deep-language analysis on text based data points and image analysis on image based data points to determine a subject matter indicated by those data points. Computing device 300 may categorize the plurality of data points into various categories based on their subject matter, for example, through a bucketing process.

At step 506, computing device 300 analyzes the subset of the data points from step 504 to determine a cognitive dimension associated with each data point of the subset of the plurality of data points. For example, computing device 300 may determine the cognitive dimensions in a manner substantially similar to step 406, as discussed above. The cognitive dimension may be positive, negative, neutral, or a varying degree of the preceding (e.g., very positive, slightly negative, or the like). Computing device 300 may adjust or re-categorize the plurality of data points to account for their associated cognitive dimensions such that data points having a common subject matter and common cognitive dimension are grouped together. At step 508, computing device 300 analyzes the subset of the plurality of data points to determine a location associated with each data point, and the location to determine a cognitive environment existing at the location. The location may be determined according to geo-tags, or may be inferred from a context of content of the data points in a manner substantially similar to step 404, as discussed above.

At step 510, computing device 300 correlates the shared subject matter, the cognitive dimension associated with each data point, and the location to determine a cognitive environment existing at the location. This correlation may adjust or re-categorize the plurality of data points to account for their associated location such that data points having a common subject matter, common cognitive dimension, and common location are grouped together. In some embodiments, computing device 300 categorizing the data points according to the common subject matter, the common cognitive dimension, and the common location may indicate a relationship between the data points that are grouped together. According to the correlation of step 510, computing device 300 determines a cognitive environment existing at each of the common locations. The cognitive environment may provide an indication of an emotional state of individuals in proximity to the common location such that the cognitive environment determined by computing device 300 is reflective of what an individual in proximity to the common location would naturally perceive to be the cognitive state surrounding him or her.

At step 512, responsive to determining the cognitive environment existing at the locations, computing device 300 determines a cognitive geofence corresponding to the cognitive environment. The cognitive geofence is defined by, for example, one or more boundaries or virtual barriers that together for the cognitive geofence that encompasses a geographic area corresponding to the cognitive environment.

At step 514, computing device 300 transmits data identifying the boundary of the cognitive geofence to a user equipment such that the data enables the user equipment to display a representation of the cognitive geofence. For example, computing device 300 may transmit the data identifying the boundary of the cognitive geofence to the user equipment to enable the user equipment to display the cognitive geofence graphically (e.g., as a map or other image), textually (e.g., as a listing of coordinated, Zone Improvement Plan (ZIP) codes, neighborhood names, boundary lines such as streets, or other text based data), or a combination of both.

Figure 6:
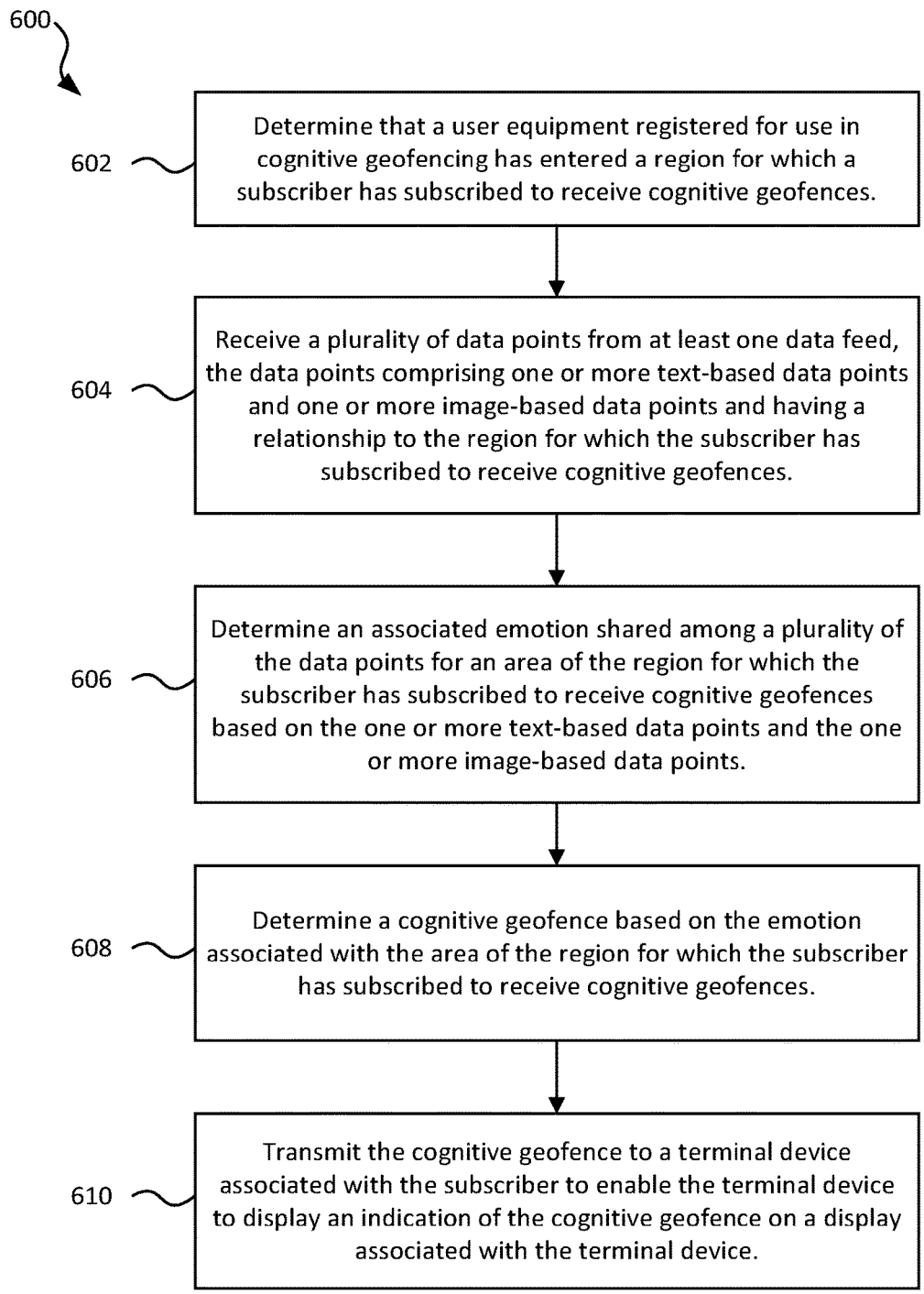
FIG. 6 depicts a flowchart of another method for determining a cognitive geofence according to an embodiment of the present disclosure.

Turning now to FIG. 6, a flowchart of another method 600 for determining a cognitive geofence according to an embodiment of the present disclosure is shown. Method 600 is a computer-implemented method, implemented by a computing device such as computing device 300, to determine a cognitive geofence based, at least in part, on one or more cognitive dimensions having a relationship to a location of the cognitive geofence and a position of a user of a user equipment with respect to the location of the cognitive geofence. The disclosed embodiments of method 600 have the advantage of determining a geofence according to an emotion shared by a plurality of persons proximate to a location and based on a position of a user with respect to the location, thereby saving computing resources by creating a geofence when a user is located near an area encompassed by the geofence. It should be understood that the following steps of method 600 may be implemented in any order and are not to be limited based on an order of discussion herein.

At step 602, computing device 300 determines that a user equipment registered for use in cognitive geofencing has entered a region for which a subscriber has subscribed to receive a cognitive geofence according to a defined set of cognitive dimensions. The determination is made, for example, to trigger computing device 300 to begin monitoring the region for the defined set of cognitive dimensions for establishing the cognitive geofence. The determination may be, for example, based on a position of the user equipment (e.g., a mobile device, a personal electronic device, a vehicle, etc.) associated with a user, or may be based on a contextual analysis of temporally recent communications by the user of the user equipment (e.g., a text message, email, phone conversation, and/or post to an Internet-based destination that indicates that the user is going to a particular destination). The subscriber may be, for example, the user associated with the user equipment, or may be another person and/or organization associated with the user equipment and/or the user. In one embodiment the user may be a delivery driver employed to make deliveries in at least the region for which the subscriber has subscribed to receive cognitive geofences and the subscriber may be a delivery company that employs the delivery driver to make the deliveries and who subscribes to receive cognitive geofences for the region. When the delivery driver enters the region, for example a town or a portion of a town, computing device 300 may begin monitoring the region for the defined set of cognitive dimensions for establishing the cognitive geofence. Alternatively, the subscriber may receive cognitive geofences for the region without respect to a location of the user. For example, a municipal or city government may subscribe to receive cognitive geofences for a region encompassing the municipality or city to, in one embodiment, better serve its residents, such as through an improved distribution of resources based on the cognitive geofences, a more rapid response by emergency responders to emergency conditions or conditions of specific importance based on the cognitive geofences, or an awareness of conditions (e.g., weather related, sudden and/or unexpected lack of power or other utilities, and the like) existing within the municipality or city based on the cognitive geofences. In such an alternative embodiment where the subscriber receives cognitive geofences for the region without respect to a location of the user, step 602 may be omitted or considered optional in method 600.

At step 604, computing device 300 receives a plurality of data points from at least one data feed in a manner substantially similar to that of step 602, as discussed above, the data points comprising one or more text-based data points and one or more image-based data points (e.g., visual images) and having a relationship to the region for which the subscriber has subscribed to receive cognitive geofences. Computing device 300 may selectively choose which data points to receive and/or retain after receiving based on a relationship between those data points and the region for which the subscriber has subscribed to receive cognitive geofences. The data points may be textual in nature, graphical in nature, or combinations thereof.

At step 606, computing device 300 determines an associated emotion shared among a plurality of the data points received at step 604 for an area of the region for which the subscriber has subscribed to receive cognitive geofences based on the one or more text-based data points and the one or more image-based data points. Computing device 300 may determine the emotion, for example, according to a context of content of the data points in a manner substantially similar to step 406, as discussed above. At step 608, computing device 300 determines a cognitive geofence based on the emotion associated with the area of the region for which the subscriber has subscribed to receive cognitive geofences. For example, returning to the delivery driver as discussed above, based on parameters for determining cognitive geofences received by computing device 300 from the subscriber, computing device 300 may create cognitive geofences around any areas of negative sentiment within the region for which the subscriber has subscribed to receive cognitive geofences so that the subscriber may delay or reroute the delivery driver so that the areas of negative sentiment may be avoided. In this way, computing device 300 may determine the cognitive geofence according to both the emotion, and geospatial characterizes such as the position of the user.

At step 608, computing device 300 transmits the cognitive geofence to a terminal device associated with the subscriber to enable the terminal device to display an indication of the cognitive geofence on a display associated with the terminal device. For example, computing device 300 may transmit the cognitive geofence to a terminal device in use by, or proximate to, the subscriber, or may transmit the cognitive geofence to the user equipment registered for use in cognitive geofencing that has entered the region for which the subscriber has subscribed to receive cognitive geofences to enable the device to display an indication of the cognitive geofence graphically (e.g., as a map or other image), textually (e.g., as a listing of coordinated, ZIP codes, neighborhood names, boundary lines such as streets, or other text based data), or a combination of both on a display associated with the device.

In some embodiments, prior to determining the cognitive geofence, computing device 300 may further determine an emotional state of the user of the user equipment, for example, according to contextual analysis of recent content published by the user, contextual analysis of photographs of the user taken proximate to a time of potential creation of the cognitive geofence, and/or speech of the user. Such embodiments have the advantage of determining a more accurate and useful geofence than those created according to the current state of the art by incorporating emotional data of the user of the user equipment when determining whether a geofence around an area is desirable. Depending on the determined emotional state of the user, computing device 300 may determine the cognitive geofence based on both the emotional state of the user and the shared emotion determined at step 606. Returning to the example of a delivery driver, a threshold for determining cognitive geofences for a driver showing signs of high stress may be lower than a threshold for determining cognitive geofences for a driver showing signs of low or no stress. Similarly, a cognitive geofence may be determined for an inexperienced driver based on a given emotional state of the inexperienced driver and the shared emotion determined at step 606 while the same cognitive geofence may not be determined for an experienced driver based on the same given emotional state and the shared emotion determined at step 606. In this manner, computing device 300 utilizes additional available information to provide geofences based on cognitive dimensions to improve over the location based geofences of the prior art.

In some embodiments, computing device 300 may be further configured to determine characteristics of the user of the user equipment, for example, according to a profile of the user developed and maintained by computing device 300 or provided to computing device 300 by the user and/or the subscriber, contextual analysis of recent content published by the user, contextual analysis of photographs of the user taken proximate to a time of potential creation of the cognitive geofence, and/or speech of the user. Such embodiments have the advantage of incorporating characteristics of the individual user of the user equipment when determining whether a geofence around an area is desirable, thereby determining a more accurate and applicable geofence useful to the individual user than those created according to the current state of the art. Depending on the characteristics of the user, computing device 300 may determine the cognitive geofence based on both the characteristics of the user and the shared emotion determined at step 606. Returning to the example of a delivery driver, based on characteristics of a certain driver and the shared emotion determined at step 606, the subscriber may wish to have certain cognitive geofences erected. For example, as determined by the characteristics of the certain driver, the certain driver may be more easily distracted by a given occurrence, that is desired by the subscriber. Therefore, the subscriber may wish to have a cognitive geofence determined around an area relating to that occurrence to delay or prevent the certain driver from entering that area until a later time.

Figure 7:
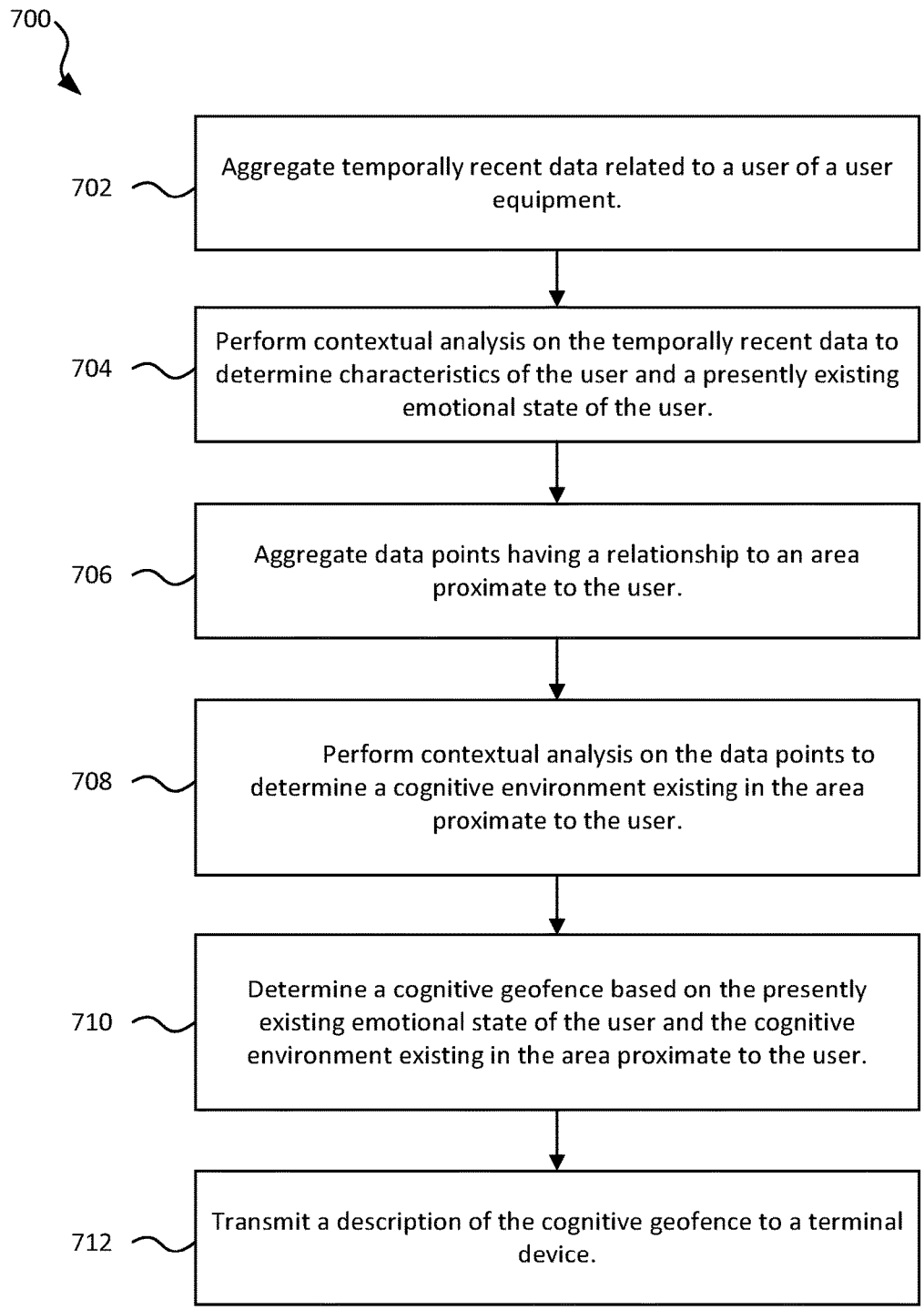
FIG. 7 depicts a flowchart of another method for determining a cognitive geofence according to an embodiment of the present disclosure.

Turning now to FIG. 7, a flowchart of another method 700 for determining a cognitive geofence according to an embodiment of the present disclosure is shown. Method 700 is a computer-implemented method, implemented by a computing device such as computing device 300, to determine a cognitive geofence based, at least in part, on one or more cognitive dimensions and/or characteristics of a user of a user equipment and one or more cognitive dimensions having a relationship to an area proximate to the user. The disclosed embodiments of method 700 have the advantage of determining a geofence according to a cognitive environment around a user, characteristics of the user, and an emotional state of the user, thereby determining a geofence more personalized to the user at a given point in time than those created according to the current state of the art. It should be understood that the following steps of method 700 may be implemented in any order and are not to be limited based on an order of discussion herein.

At step 702, computing device 300 aggregates temporally recent data related to a user of a user equipment. For example, in one embodiment, computing device 300 may obtain and aggregate any one or more of publicly-available content published to online sources for a given period of time preceding the instant point in time, communications transmitted by the user using a device that has been registered to enable computing device 300 to aggregate communications transmitted by the device, images of the user (e.g., as taken by the user equipment, a dash camera in a vehicle of the user, and the like), and other like sources. At step 704, computing device 300 determines characteristics of the user and a presently existing emotional state of the user. The determinations may be made, for example, according to a contextual and semantic analysis of the data aggregated at step 702, and may be performed in a manner substantially similar to that of method 600, as discussed above.

At step 706, computing device 300 aggregates data points having a relationship to an area proximate to the user. Computing device 300 may receive the data in a manner substantially similar to that of step 402, as discussed above, with the data points being textual and/or graphical in nature and having a temporal recency. At step 708, computing device 300 performs a contextual analysis on the data points to determine a cognitive environment existing in the area proximate to the user. The cognitive environment may be determined, for example, by determining that a number of data points having the relationship to the area proximate to the user share a common cognitive dimension (e.g., emotion) as indicated by a content of the respective data points. At step 710, computing device 300 determines a cognitive geofence based on the presently existing emotional state of the user and the cognitive environment existing in the area proximate to the user, for example, as discussed above with respect to method 600.

At step 712, computing device 300 transmits a description of the cognitive geofence to a terminal device. For example, computing device 300 may transmit the cognitive geofence to a terminal device in use by, or proximate to, a subscriber who has subscribed to receive notifications of cognitive geofences to enable the terminal device to present a representation of the cognitive geofence to the subscriber.

In some embodiments, computing device may determine the cognitive environment existing in the area proximate to the user at step 706 based on one or more concepts indicated by the data points aggregated at step 702. Such embodiments have the advantage of accounting for varied subject matter when determining the cognitive environment around the user, thereby saving computing resources by determining a geofence when multiple persons express a common cognitive characteristic about a common subject, thus determining a more useful geofence than those created according to the current state of the art. For example, computing device 300 may determine a concept indicated by each of the data points. Computing device 300 may determine the concepts through any one or more means such as named entity recognition in which computing device 300 identifies entities and facets as described above, or through a concept extraction process. Computing device 300 may then determine a number of the data points that share a common concept, and a common cognitive dimension shared among the data points that share the common concept. In this way, computing device 300 may then determine whether a number of data points that share the common concept, and the common cognitive dimension exceeds a threshold for determining the common cognitive dimension as indicating the cognitive environment existing in the area proximate to the user. When the number of data points exceeds the threshold, computing device 300 determines the common cognitive dimension as the cognitive environment existing in the area proximate to the user.

Alternatively, in some embodiments, the cognitive geofence may be based on the presently existing emotional state of the user and a set of rules, without considering the cognitive environment existing in the area proximate to the user. For example, for a user who is determined at step 704 to have a negative presently existing emotional state, a cognitive geofence, a recommendation for improving the user's presently existing emotional state (e.g., an advertisement for a massage, a coupon for a relaxing beverage, etc.) may be identified for vendors or locations proximate to the user and/or a known route of the user. In such embodiments, computing device 300 may form one or more cognitive geofences around the vendors or locations proximate to the user and/or the known route of the user such that the recommendation for improving the user's presently existing emotional state is transmitted to the user (e.g., by computing device 300 and/or another device that has obtained information related to the user and/or the cognitive geofence from computing device 300) upon the user entering an area bounded by the cognitive geofence.

Figure 8:
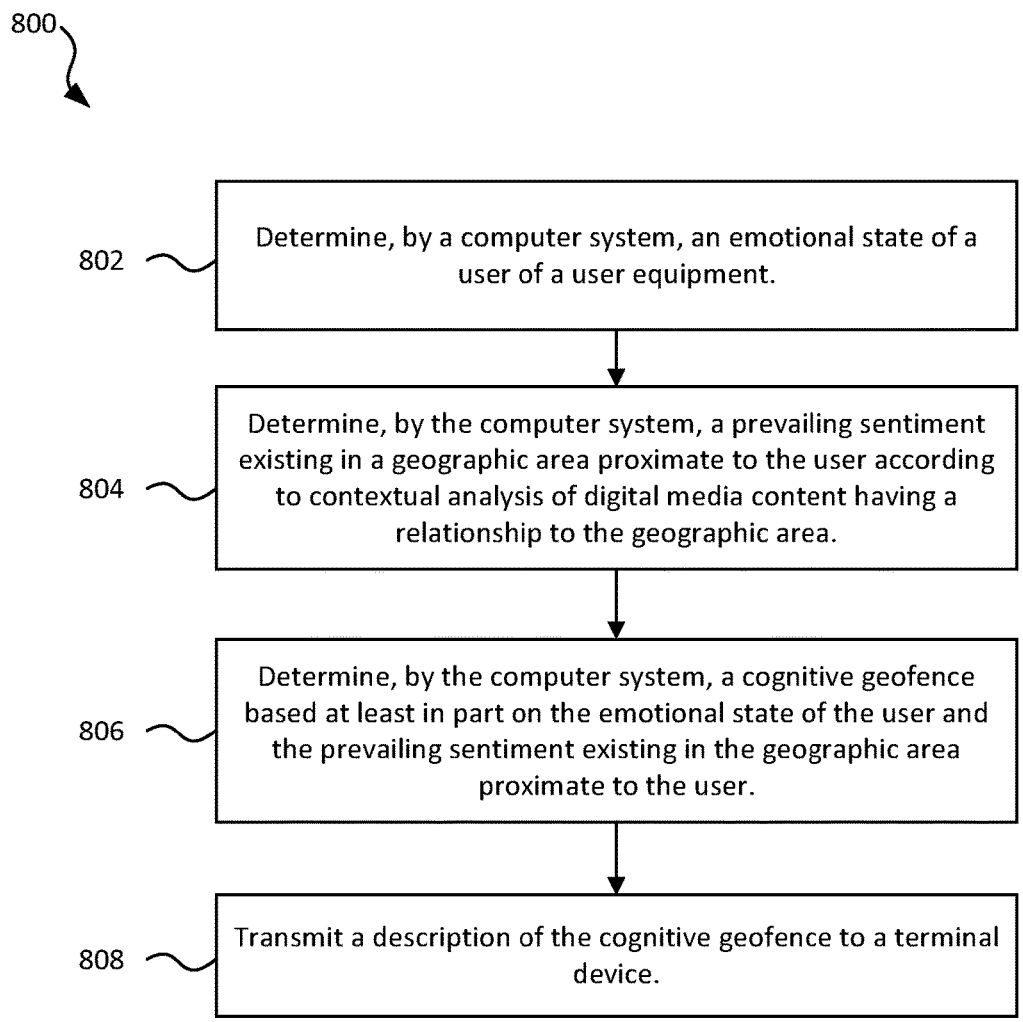
FIG. 8 depicts a flowchart of another method for determining a cognitive geofence according to an embodiment of the present disclosure.

Turning now to FIG. 8, a flowchart of another method 800 for determining a cognitive geofence according to an embodiment of the present disclosure is shown. Method 800 is a computer-implemented method, implemented by a computing device such as computing device 300, to determine a cognitive geofence based, at least in part, on an emotional state of a user of a user equipment and a prevailing sentiment in a geographic area proximate to the user. The disclosed embodiments of method 800 have the advantage of determining a geofence according to a prevailing sentiment around a user and an emotional state of the user, thereby determining a geofence more local to the user and more personalized to the user at a given point in time than those created according to the current state of the art. It should be understood that the following steps of method 800 may be implemented in any order and are not to be limited based on an order of discussion herein.

At step 802, computing device 300 determines an emotional state of a user of a user equipment. Computing device 300 may make the determination of the emotional state of the user based on contextual analysis of publicly-available data related to the user, for example, in a manner substantially similar to step 702, as discussed above, and may consider audio, graphical, and/or textual content.

At step 804, computing device 300 determines a prevailing sentiment existing in a geographic area proximate to the user according to contextual analysis of digital media content having a relationship to the geographic area. The prevailing sentiment may indicate the cognitive environment or emotional state existing in the geographic area proximate to the user as determined by online content published by a plurality of individuals in the geographic area proximate to the user. The prevailing sentiment may further be determined according to a contextual analysis and/or named entity recognition of textual and/or graphical digital media having a relationship to the geographic area proximate to the user to determine concepts expressed by the digital media and/or sentiment analysis to determine sentiment associated with the concepts. For example, computing device 300 may obtain the digital media from any one or more online content sources such as social media, news, videos, photographs, message board posts, blog posts, posted comments, weather, and traffic, and may have a temporal recency with respect to a time at which the prevailing sentiment is determined by computing device 300. In some embodiments, computing device 300 may infer a location associated with the concepts from the contextual analysis of the digital media.

At step 806, computing device 300 determines a cognitive geofence based at least in part on the emotional state of the user and the prevailing sentiment existing in the geographic area proximate to the user. At step 808, computing device 300 transmits a description of the cognitive geofence to a terminal device. For example, computing device 300 may transmit the cognitive geofence to a terminal device in use by, or proximate to, a subscriber who has subscribed to receive notifications of cognitive geofences to enable the terminal device to present a representation of the cognitive geofence to the subscriber.

In some embodiments, computing device 300 may consider subscriber input when determining the cognitive geofence. Such embodiments have the advantage of creating geofences tailored to a subscriber's desired preferences, thereby saving computing resources as compared to embodiments according to the current state of the art by only creating geofences when the subscriber's desired preferences are met. For example, computing device 300 may receive input from a subscriber to a service for cognitive geofences, for example when cognitive geofencing is presented to the subscriber according to a software as a service model, where the input defines at least one characteristic of cognitive geofences desired by the subscriber. The characteristic desired by the subscriber may in some embodiments be, for example, existence of a particular cognitive dimension, a density of a certain cognitive dimension exceeding a threshold, a maximum and/or minimum size for the cognitive geofences, a geographic area in which at least part of the cognitive geofences should occur, a desired emotional state or characteristic of the user, or any combination of the above. Computing device 300 may then determine the cognitive geofence when the at least one characteristic of cognitive geofences desired by the subscriber is satisfied and/or present in data received by computing device 300.

In some embodiments, computing device 300 may further determine the cognitive geofence according to additional criteria. Such embodiments have the advantage of incorporating a wide range of input to geofence determinations, thereby determining a more accurate and useful geofence than those created according to the current state of the art. For example, computing device 300 may determine the cognitive geofence according to an emotional profile of the user, a profile of a location that will be at least partially encompassed by the cognitive geofence, or a population analysis of a population of persons having a relationship to the location that will be at least partially encompassed by the cognitive geofence.

Figure 9:
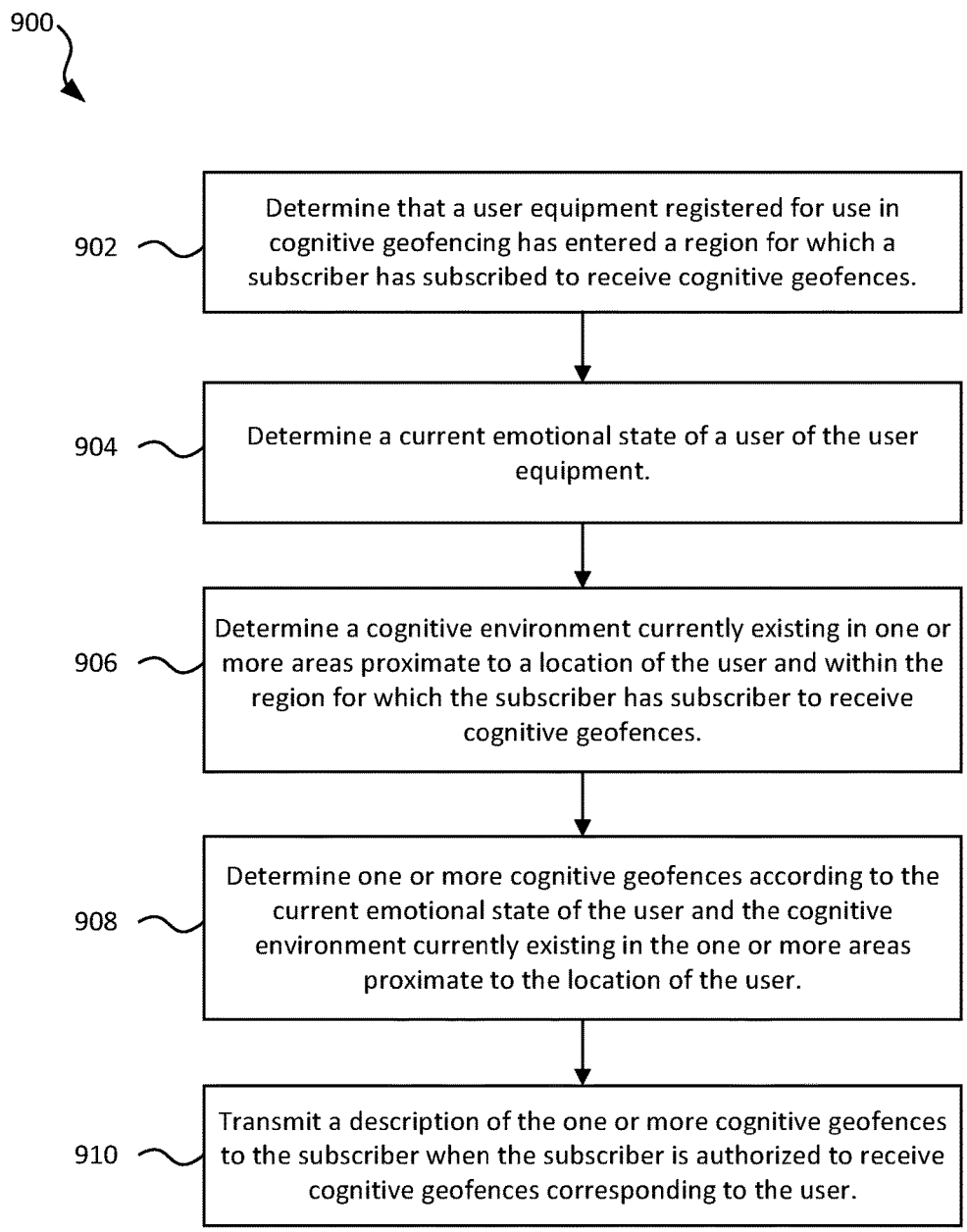
FIG. 9 depicts a flowchart of another method for determining a cognitive geofence according to an embodiment of the present disclosure.

Turning now to FIG. 9, a flowchart of another method 900 for determining a cognitive geofence according to an embodiment of the present disclosure is shown. Method 900 is a computer-implemented method, implemented by a computing device such as computing device 300, to determine a cognitive geofence based, at least in part, on an emotional state of a user of a user equipment, a position of the user with respect to a of the cognitive geofence, and a cognitive environment existing in an area proximate to a location of the user. The disclosed embodiments of method 900 have the advantage compared to the state of the art of determining a geofence according to a cognitive environment around a user, an emotional state of the user, and based on a position of a user with respect to the location, thereby saving computing resources by creating a geofence when a user is located near an area encompassed by the geofence and when the geofence is applicable to the user's emotional state. It should be understood that the following steps of method 900 may be implemented in any order and are not to be limited based on an order of discussion herein.

At step 902, computing device 300 determines that a user equipment registered for use in cognitive geofencing has entered a region for which a subscriber has subscriber to receive cognitive geofences. Computing device 300 may make the determination in a manner substantially similar to step 602, as discussed above. At step 904, computing device 300 determines a current emotional state of a user of a user equipment. Computing device 300 may make the determination of the emotional state of the user based on contextual analysis of publicly-available data related to the user, for example, in a manner substantially similar to step 702, as discussed above, and may consider audio, graphical, and/or textual content.

At step 906, computing device 300 determines a cognitive environment currently existing in one or more areas proximate to a location of the user and within the region for which the subscriber has subscriber to receive cognitive geofences. Computing device 300 may make the determination in a manner substantially similar to those discussed above. At step 908, computing device 300 determines one or more cognitive geofences according to the current emotional state of the user and the cognitive environment currently existing in the one or more areas proximate to the location of the user.

At step 910, computing device 300 transmits a description of the one or more cognitive geofences to the subscriber when the subscriber is authorized to receive cognitive geofences corresponding to the user. Computing device 300 may transmit the description of the one or more cognitive geofences to, for example, a terminal device of the subscriber such that the description of the one or more cognitive geofences enables the terminal device of the subscriber to present the one or more cognitive geofences to the subscriber through one or more graphical and/or textual representations.

In some embodiments, each of the one or more cognitive geofences may encompass a portion, but not all, of the region for which the subscriber has subscriber to receive cognitive geofences. For example, returning to the prior example of a delivery driver, the region may be defined by the subscriber as a city or a portion of a city. Within that region, computing device 300 may determine one or more cognitive geofences surrounding areas of negative sentiment directed toward driving conditions, for example, as a result of high traffic density, construction, temporary obstacles, or poor road surface conditions. Each of these cognitive geofences may be relatively small in nature such that they encompass, for example, a portion of a road, an intersection, a bridge, a neighborhood, or the like.

In some embodiments, computing device 300 may provide cognitive geofencing determination services to subscribers as a software as a service offering. In such embodiments, the subscribers may pay a fee for accessing the cognitive geofencing services, and in return have an ability to submit parameters for desired cognitive geofences and receive descriptions of cognitive geofences in return in an on-demand manner.

Figure 10:
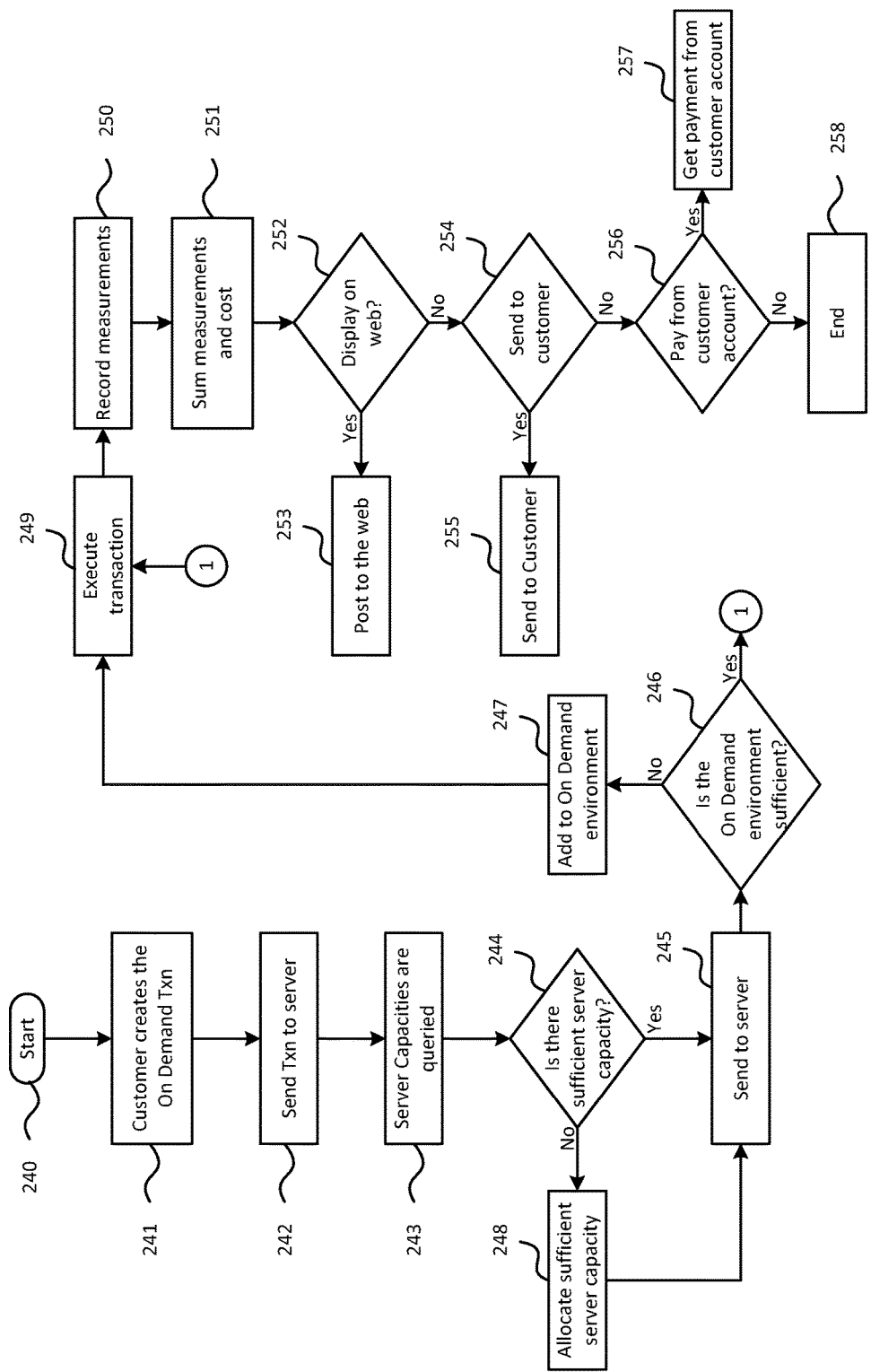
FIG. 10 depicts a flowchart of an on-demand service process according to an embodiment of the present disclosure.

Turning now to FIG. 10, a flowchart of an on-demand service process according to an embodiment of the present disclosure is shown.

The process software (e.g., the cognitive geofencing determination provided by computing device 300) is shared, simultaneously serving multiple customers in a flexible, automated fashion. It is standardized, requiring little customization, and it is scalable, providing capacity on demand in a pay-as-you-go model.

The process software can be stored on a shared file system accessible from one or more servers. The process software is executed via transactions (Txns) that contain data and server processing requests that use central processing unit (CPU) units on the accessed server. CPU units are units of time, such as minutes, seconds, and hours, on the central processor of the server. Additionally, the accessed server may make requests of other servers that require CPU units. CPU units are an example that represents but one measurement of use. Other measurements of use include, but are not limited to, network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use, such as network bandwidth, memory usage, storage usage, etc., approach a capacity so as to affect performance, additional network bandwidth, memory usage, storage, etc. are added to share the workload.

The measurements of use employed for each service and customer are sent to a collecting server that sums the measurements of use for each customer for each service that was processed anywhere in the network of servers that provide the shared execution of the process software. The summed measurements of use units are periodically multiplied by unit costs, and the resulting total process software application service costs are alternatively sent to the customer and/or indicated on a web site accessed by the customer, who may then remit payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Step 240 begins the On Demand process. A transaction is created that contains the unique customer identification, the requested service type, and any service parameters that further specify the type of service (241). The transaction is then sent to the main server (242). In an On Demand environment, the main server can initially be the only server, and then as capacity is consumed other servers are added to the On Demand environment.

The server CPU capacities in the On Demand environment are queried (243). The CPU requirement of the transaction is estimated, and then the server's available CPU capacity in the On Demand environment is compared to the transaction CPU requirement to see if there is sufficient CPU available capacity in any server to process the transaction (244). If there is not sufficient server CPU available capacity, then additional server CPU capacity is allocated to process the transaction (248). If there was already sufficient available CPU capacity, then the transaction is sent to a selected server (245).

Before executing the transaction, a check is made of the remaining On Demand environment to determine if the environment has sufficient available capacity for processing the transaction. This environment capacity consists of such things as, but not limited to, network bandwidth, processor memory, storage etc. (246). If there is not sufficient available capacity, then capacity will be added to the On Demand environment (247). Next the required software to process the transaction is accessed, loaded into memory, and then the transaction is executed (249).

The usage measurements are recorded (250). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs, and then recorded as a charge to the requesting customer (251).

If the customer has requested that the On Demand costs be posted to a web site (252), then they are posted thereto (253). If the customer has requested that the On Demand costs be sent via e-mail to a customer address (254), then they are sent (255). If the customer has requested that the On Demand costs be paid directly from a customer account (256), then payment is received directly from the customer account (257). On Demand process proceeds to 258 and exits.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A computer-implemented method, comprising:
   determining, prior to generation of a cognitive geofence, that a user has entered a region or which a subscriber to a cognitive geofencing service has subscribed to receive the cognitive geofence;
   obtaining, by a computer system that is capable of learning, a plurality of temporally recent data points, each data point comprising at least one entity and at least one facet;
   determining, by the computer system, a location associated with the plurality of temporally recent data points;
   determining, by the computer system, an emotion indicated by the at least one facet and shared by a group of the plurality of temporally recent data points;
   generating, by the computer system, a virtual barrier that bounds the location associated with the plurality of temporally recent data points, the at least one entity, and the at least one facet based on the emotion indicated by the at least one facet; and
   transmitting, by the computer system, a description of an area bounded by the virtual barrier to a terminal of the subscriber to the cognitive geofencing service to cause the terminal to display the virtual barrier as the cognitive geofence.

2. The computer-implemented method of claim 1, wherein the virtual barrier is further generated at least in part according to parameters received from the subscriber to the cognitive geofencing service.

3. The computer-implemented method of claim 1, wherein the cognitive geofencing service is provided as a service to the subscriber in a cloud environment.

4. The computer-implemented method of claim 1, wherein one or more of the at least one entity and the at least one facet is determined according to a visual image.

5. The computer-implemented method of claim 1, wherein the location associated with the plurality of temporally recent data points is determined according to a visual image originating from the location.

6. The computer-implemented method of claim 1, wherein the entity is a subject matter of at least one of the plurality of temporally recent data points, and wherein the at least one facet corresponds to the at least one entity and is a meaningful descriptive element of the at least one of the plurality of temporally recent data points.

7. The computer-implemented method of claim 1, wherein the at least one entity is identified within each data point according to named entity recognition.

8. A computer program product for determining a cognitive geofence, the computer program product comprising a computer readable storage medium having program instructions embodied therewith, the program instructions executable by a processor to cause the processor to:
determine, prior to generation of a cognitive geofence, that a user has entered a region for which a subscriber to a cognitive geofencing service has subscribed to receive the cognitive geofence;
obtain a plurality of temporally recent data points, each data point comprising at least one entity and at least one facet;
determine a location associated with the plurality of temporally recent data points;
determine an emotion indicated by the at least one facet and shared by a group of the plurality of temporally recent data points;
generate a virtual barrier that bounds the location associated with the plurality of temporally recent data points, the at least one entity, and the at least one facet based on the emotion indicated by the at least one facet; and
transmit a description of an area bounded by the virtual barrier to a terminal of the subscriber to the cognitive geofencing service to cause the terminal to display the virtual barrier as the cognitive geofence.

9. The computer program product of claim 8, wherein the virtual barrier is further generated at least in part according to parameters received from the subscriber to the cognitive geofencing service.

10. The computer program product of claim 8, wherein the cognitive geofencing service is provided as a service to the subscriber in a cloud environment.

11. The computer program product of claim 8, wherein one or more of the at least one entity and the at least one facet is determined according to a visual image.

12. The computer program product of claim 8, wherein the location associated with the plurality of temporally recent data points is determined according to a visual image originating from the location.

13. The computer program product of claim 8, wherein the entity is a subject matter of at least one of the plurality of temporally recent data points, and wherein the at least one facet corresponds to the at least one entity and is a meaningful descriptive element of the at least one of the plurality of temporally recent data points.

14. The computer program product of claim 8, wherein the at least one entity is identified within each data point according to named entity recognition.

15. A system capable of learning, the system comprising a processor configured to:
determine, prior to generation of a cognitive geofence, that a user has entered a region for which a subscriber to a cognitive geofencing service has subscribed to receive the cognitive geofence;
obtain a plurality of temporally recent data points, each data point comprising at least one entity and at least one facet;
determine a location associated with the plurality of temporally recent data points;
determine an emotion indicated by the at least one facet and shared by a group of the plurality of temporally recent data points;
generate a virtual barrier that bounds the location associated with the plurality of temporally recent data points, the at least one entity, and the at least one facet based on the emotion indicated by the at least one facet; and
transmit a description of an area bounded by the virtual barrier to a terminal of the subscriber to the cognitive geofencing service to cause the terminal to display the virtual barrier as the cognitive geofence.

16. The system of claim 15, wherein the virtual barrier is further generated at least in part according to parameters received from the subscriber to the cognitive geofencing service.

17. The system of claim 15, wherein one or more of the at least one entity and the at least one facet is determined according to a visual image.

18. The system of claim 15, wherein the location associated with the plurality of temporally recent data points is determined according to a visual image originating from the location.

19. The system of claim 15, wherein the entity is a subject matter of at least one of the plurality of temporally recent data points, and wherein the at least one facet corresponds to the at least one entity and is a meaningful descriptive element of the at least one of the plurality of temporally recent data points.

20. The system of claim 15, wherein the at least one entity is identified within each data point according to named entity recognition.

* * * * *